United States Patent [19]
Sherwood

[11] Patent Number: 4,898,153
[45] Date of Patent: Feb. 6, 1990

[54] SOLAR ENERGY PANEL

[76] Inventor: Daniel A. Sherwood, 3905 Orangewood Dr., Fair Oaks, Calif. 95628

[21] Appl. No.: 332,158

[22] Filed: Apr. 3, 1989

[51] Int. Cl.[4] .................................................. F24J 2/24
[52] U.S. Cl. .................................... 126/448; 126/445; 165/170; 165/176
[58] Field of Search ............... 126/444, 445, 448, 450; 165/150, 170, 171, 174, 176

[56] References Cited

U.S. PATENT DOCUMENTS

| | | | |
|---|---|---|---|
| 4,156,419 | 5/1979 | Lewis | 165/170 |
| 4,265,225 | 5/1981 | Berger et al. | 126/448 |

FOREIGN PATENT DOCUMENTS

| | | | |
|---|---|---|---|
| 2709801 | 9/1978 | Fed. Rep. of Germany | 126/448 |
| 2742659 | 3/1979 | Fed. Rep. of Germany | 126/445 |
| 2309822 | 11/1976 | France | 126/448 |

Primary Examiner—James C. Yeung
Attorney, Agent, or Firm—Mark C. Jacobs

[57] ABSTRACT

A low cost easily assembled solar energy panel employing as its major component, a double skinned sheet of polycarbonate which has a plurality of preferably uniformly spaced, rib members separating the two skins. The panel may employ a fluid input and fluid output at the same end of the panel or at opposite ends thereof.

13 Claims, 4 Drawing Sheets

SOLAR ENERGY PANEL

FIELD OF INVENTION

This application pertains to a low cost solar energy panel useful for domestic and industrial hot water heating, swimming pool heating, and home heating.

BACKGROUND OF THE INVENTION

Devices for collecting solar radiation and converting the radiation absorbed by a fluid running through therethrough into useful energy are called solar collectors. The energy output is the heat that arises as a result of the fluid, usually water in the collector being heated by the sun's rays. One deterrent to the anticipated growth of the solar home and industrial heating industry has been the high cost of the solar panels, both in original cost and for the maintenance thereof.

One object therefore of this invention is to provide a relatively easy to manufacture, low cost solar collector.

Another object is to provide a solar collector that can be fabricated from an assemblage of parts by the do-it-yourself homeowner.

Yet another object is to provide a solar collector that is easily retrofitable into existing solar energy systems.

Other objects of the invention will in part be obvious and will in part appear hereinafter.

The invention accordingly comprises the product possessing the features, properties and the relation of components which are exemplified in the following detailed disclosure, and the scope of the application of which will be indicated in the appended claims.

For a fuller understanding of the nature and objects of the invention, reference should be made to the following detailed description taken in connection with the accompanying drawings.

SUMMARY OF THE INVENTION

Figure 1:
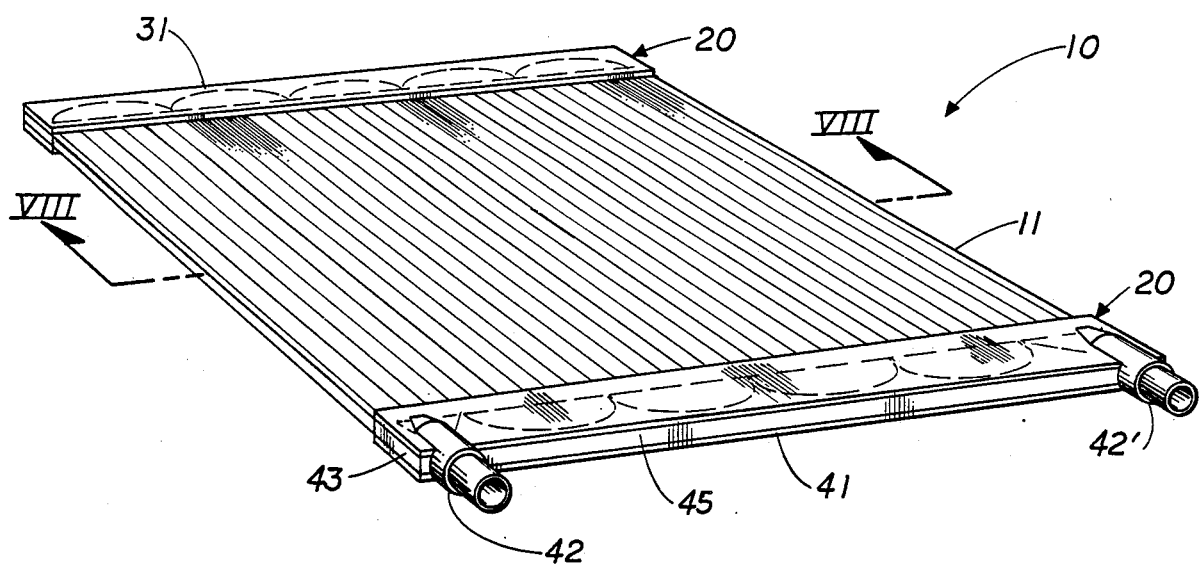
FIG. 1 is a top perspective view of the first embodiment of this invention.

A solar collector for the heating of fluid passing therethrough comprising a main body portion and a pair of opposed terminal portions. One of said terminal portions may be a cover cap such that the input and output means are located in the same terminal portion, or both ends may be end caps each of which includes one of either the input or the output means.

DESCRIPTION OF THE PREFERRED EMBODIMENT

The first embodiment 10, of this invention is comprises of three main portions; namely, a main body portion 11 and a pair of opposed spaced terminal portions 20. Here, one terminal portion is a cover cap 31, to be described below while the other terminal portion is a dual port means 41.

Figure 3:
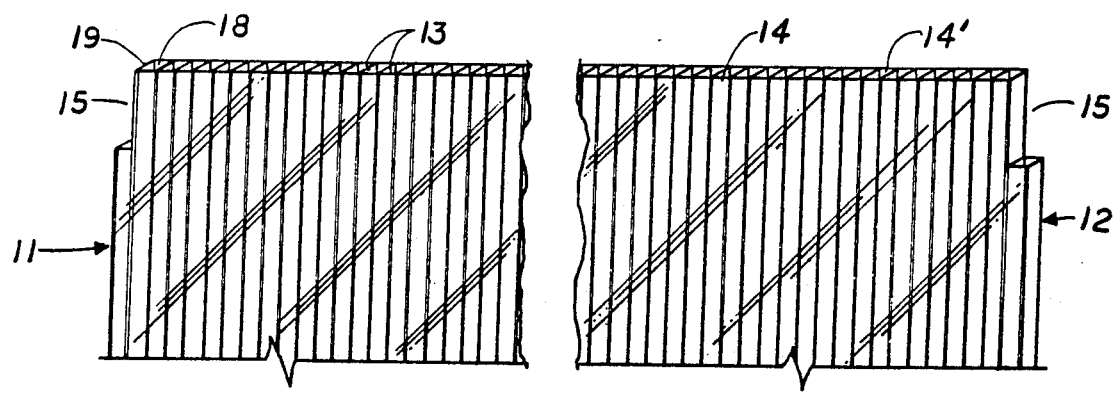
FIG. 3 is a view similar to that of FIG. 2 but of the second end of the device of the first embodiment.
Figure 8:
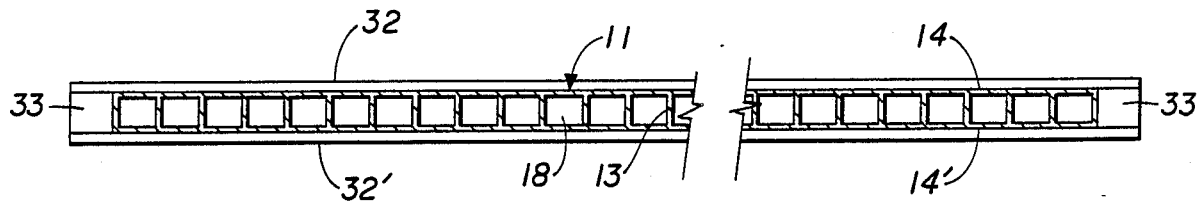
FIG. 8 is a view taken along line VIII—VIII of FIG. 1.

The main body portion 11 is, per FIG. 3, a preferably one piece integrated structure 12, comprising a double skinned or two skin 14, 14' sheet separated by a series of, preferably uniformly, spaced parallel ribs 13, which ribs run the full length of the sheet. The spacing between the ribs creates a plurality of channels, 18. Such a structure, may be made of any plastic material, such as acrylic, or styrene. A preferred plastic due to shatter resistance and good temperature resistance is polycarbonate. A structure as described is available in the market place from the General Electric Company under the trademark Polygal. See FIG. 8

Figure 2:
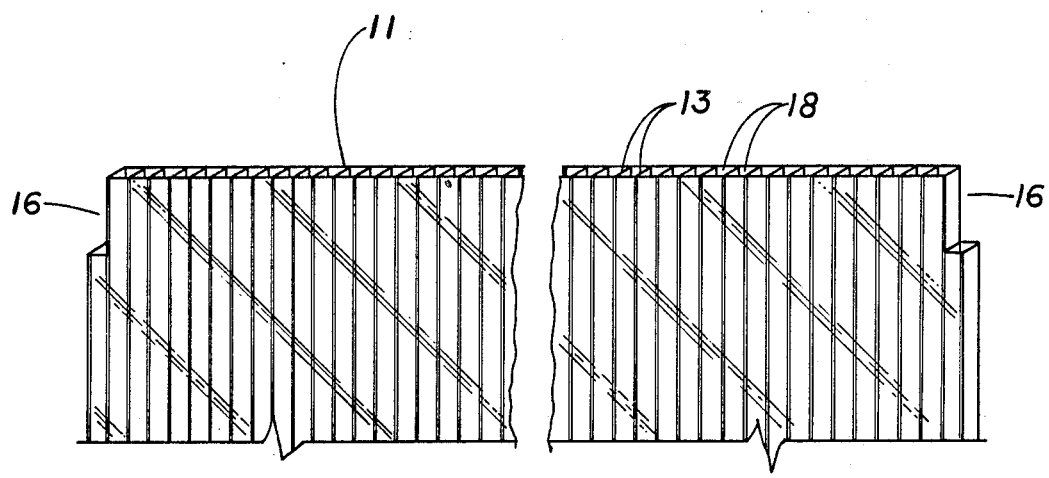
FIG. 2 is a closeup perspective view of the first end of the main body portion of the device of this embodiment.

As seen in FIG. 2, structure 12 includes at both the left and right sides a corner notch 15. This notch is sized in length from the edge 19 an amount corresponding to the length of the end cap. This can vary from about 1 inch to about 4 inches or more and preferably is about 2 inches. Inwardly from the long sides of main body structure 12 the notch is one channel width in depth, which is about ¼ inch.

At the opposite end, or port means end, per FIG. 2 there are also corner notches designated 16, also of the same size as notch 15.

Figure 4:
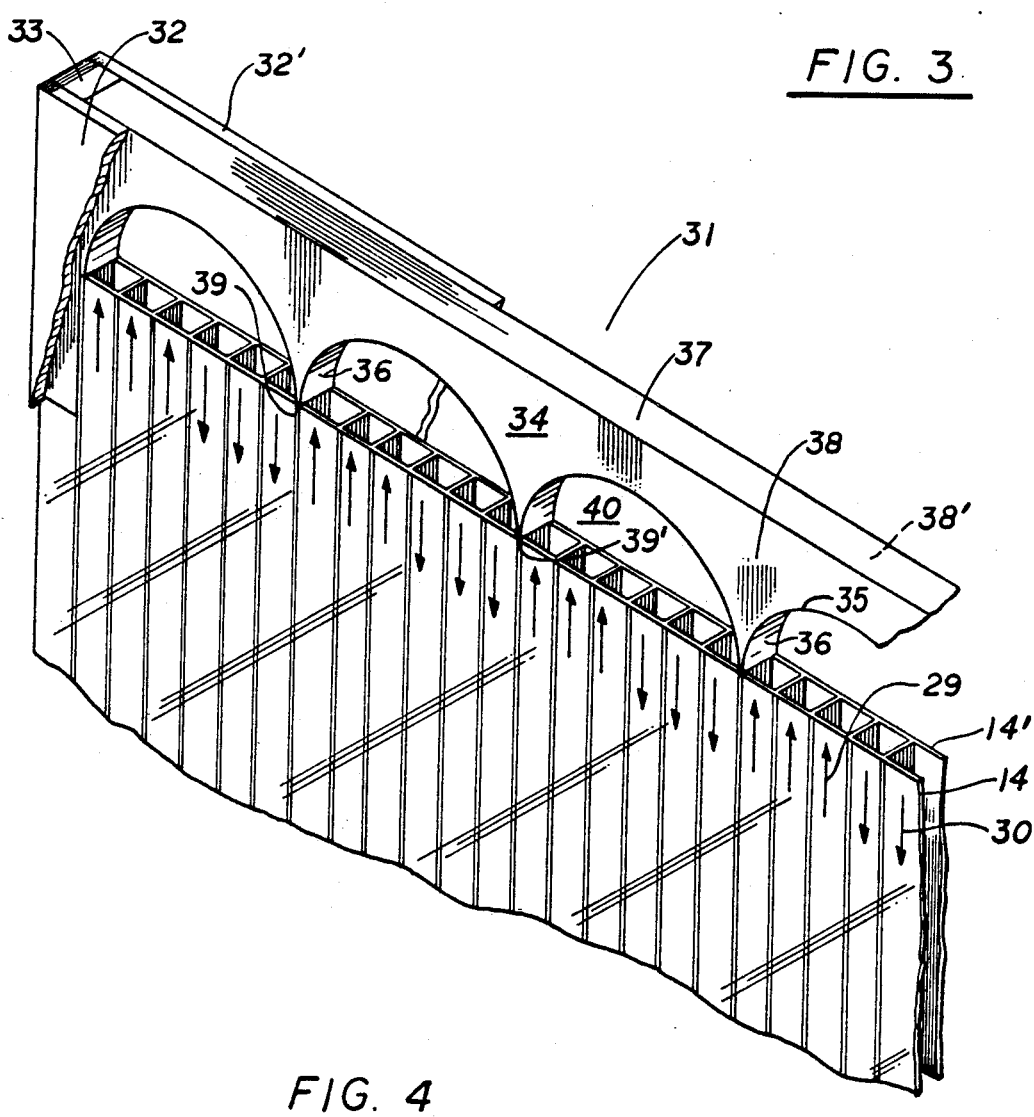
FIG. 4 is a closeup perspective view of the details of the end cap baffles employed in this invention's first embodiment.

End cover cap 31, per FIG. 4, comprises a pair of skins 32, 32' having a pair of end blocks 33 therebetween at opposite ends and a baffle member 34 interposed therebetween, which baffle member has a plurality of linearly aligned semicircular arc sections 35 removed therefrom such that baffle member has a series of aligned concave recesses 36, on its inner face and a smooth rear outer face, 37. One such recess is seen to lie between the two tips or extremities 39, and 39'. The next one would lie adjacent thereto between 39' and 39" (not seen). Thus there is a junction of two adjacent recesses at a common tip. The upper and lower surfaces 38, 38, thereof are planar. End blocks 33 are sized to fit within recesses 15 of main body portion 11 (see FIG. 2). It is further seen that a finite number of channels, 18, here six in number lie between each pair of these spaced tips such as 39, 39,. The volume 40 defined by the concave recess 36 serves to receive fluid flowing from one direction and to act as a turning point for fluid to then reverse directions and to flow oppositely. See FIG. 4 with reference to directional arroWs 29 and 30. S ⓡ ⓡ the end interior view FIG. 8.

Figure 5:
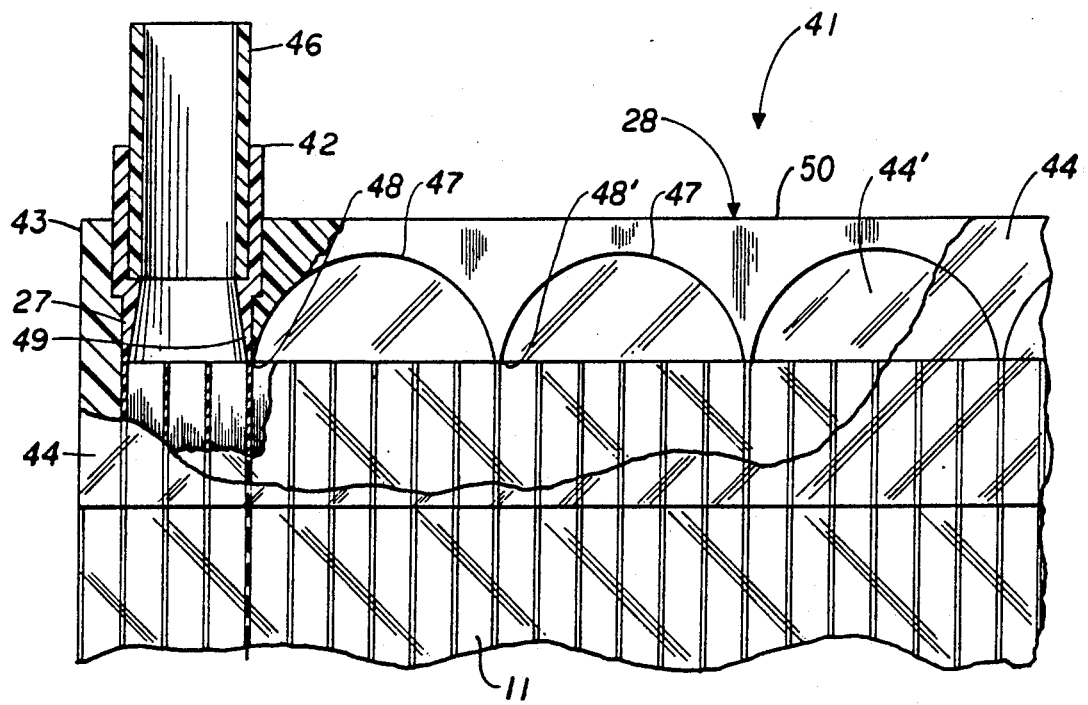
FIG. 5 is a detailed sectional view of the end section of the input/output cap of the first embodiment.

The discussion now turns to FIGS. 3 and 5 which pertains to the port end of the main body portion 11. Designator 13 and 18 still refer to the ribs and channels also described previously.

Port cap 41 as seen in FIGS. 1 and 5, comprises a pair of upper and lower skins 44, 44, having a pair of end blocks 43 therebetween at opposite ends and a baffle member 28 interposed therebetween, which baffle member has a plurality of linearly aligned semicircular arc sections removed therefrom such that baffle member 28 has a series of aligned concave recesses 47, on its inner face and a smooth rear outer face, 50. Note the relative positioning laterally of these recesses, which position is offset ½ recess from its opposite recess on baffle member 34. Like baffle member 28 the upper and lower surfaces 44, 44' of baffle member 28 are planar. End blocks 43 are sized to fit within recesses of main body portion 11 (see FIG. 1).

Baffle member 28 while having upper and lower surfaces and front and rear walls as does baffle member 34 (see FIG. 4) does however differ from baffle member 34 in that it includes terminal portions 27 which extend inwardly from each of the respective end block 43, a distance equal to the width of third channel from the notch 16 (see FIG. 3). See FIG. 5 with reference to imaginary line (shown dashed) 52, which begins at the tip of the first recess 47 and extends normal to wall 50 of the baffle member which indicates the width of terminal portions 27.

A quick glance at FIG. 4 & 5 calls to the reader's attention to the fact that in the first embodiment, there is one more recess in the end cap than in the port cap. Also, the recesses of the end cap are laterally offset ½ recess from the relative lateral location of the corresponding in number recess of the port cap. This is because each port fluidly communicates with ½ the number of channels as does a recess. Fluid flows unidirectionally through a port, but the same amount of fluid entering a recess from a finite number of channels, such as 6 shown in FIGS. 4 & 5, must reverse direction and flow the other direction after being turned around in each opposite recess.

In FIG. 5 terminal portion 27 includes a tubular port receiving section 42 which is open at its outer end and which terminates by an optionally tapered, transition portion 49 in fluid communication with the 2nd, 3rd, and 4th channels in from each side edge of main body 11. No fluid flows in the first channel since it does not communicate with the port and solid material abuts the openinq therein in any event as is clearly shown in FIG. 5. Whether a transition portion 49 will be needed on the underside of the port cap will depend upon the thickness, i.e. the elevation of the port cap and the relative positioning of the tubular port receiving section 42 thereto. In most instances, such a transition section will be necessary on the upper and lower surfaces of the port cap 41.

Port receiving section 42 is sized in internal diameter slightly larger than the external diameter of port 46 which may be either a slip-fit or threaded member for connection to the said port receiving section 42. Obviously port receiving section 42 and port 46 may be of the same diameter and made as an integral unit if desired.

Thus as seen in FIG. 5, the fluid entering port cap 41 via port 46 flows into channels 2, 3, and 4—per FIG. 3. Junction tip 48 prevents spill-over into channel 5 and the other junction tips 48' serve the same spill-over prevention purpose.

In FIG. 5 only one of the two ports and the associated components associated therewith have been described. The other such port is a mirror image thereof, as can be seen from FIG. 1 and as such no further discussion is needed.

It should be pointed out that the thickness of the two termini is greater than the thickness of the main body portion 11. Reference is made to FIG. 1 for example. It is seen therefore that the two skins of end cap 31, 32, 32' are partially superposed over the two skins 14, 14' of said main body 11. A suitable amount of overlay on to skins 14, 14' beyond the baffle is between 1 and 2.5" inches. The construction of the port cap is of like fashion with the skins 44 & 44' thereof overlaying the main body skins 14 & 14, a similar amount in extension. If desired, a bead of suitable caulk can be placed along the interface edge of the skin of the cap with the skin of the main body after the caps have been adhesed to the main body.

Figure 6:
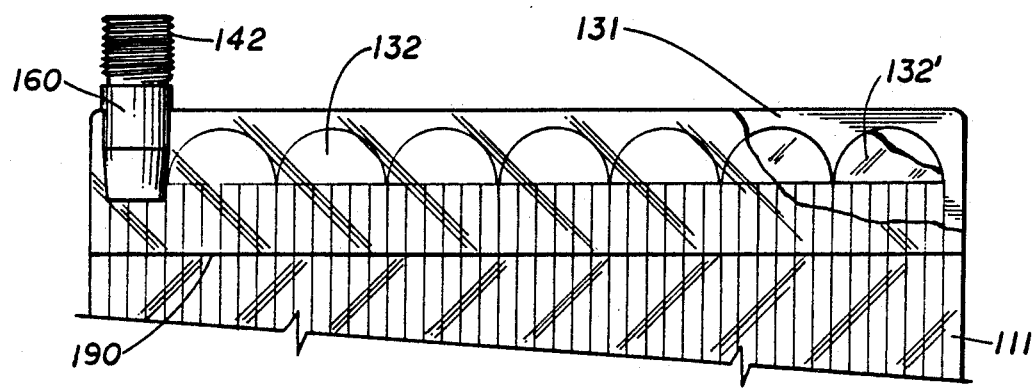
FIG. 6 is a plan view of the obverse side of one end of the second embodiment of this invention.
Figure 7:
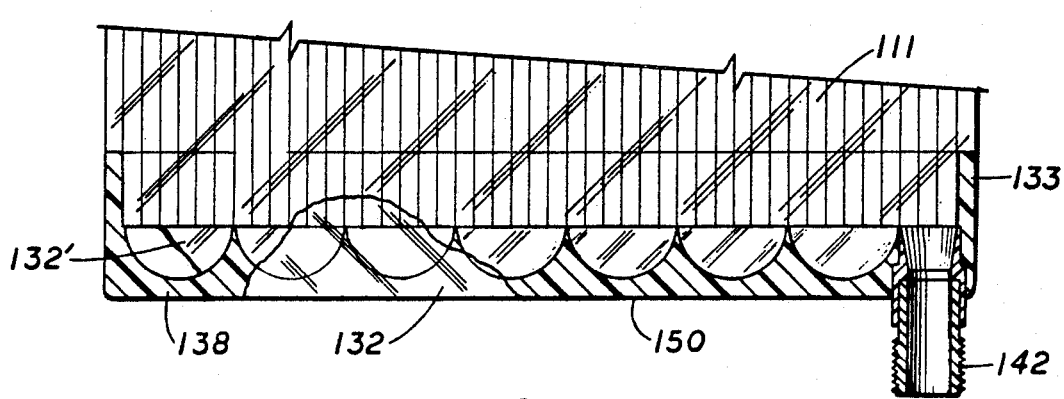
FIG. 7 is a plan view of the reverse side of the opposite end of the second embodiment, wherein one skin of the end cap thereof has been omitted.

Reference is made now to FIGS. 6, 7 and which pertain to a variant of the apparatus of FIG. 1. Here, each end cap is a monoport component, with the location of the ports being mirror imaged; whereas in the first embodiment there was one distinct end cap with no ports and one with two ports. FIG. 6 is a plan view of the obverse side showing one of the monoport caps. FIG. 7 is a view of the reverse face thereof with one skin of the cap partially removed.

Figure 10:
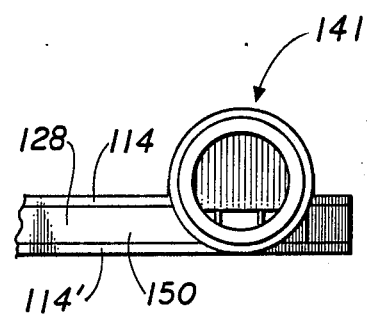
FIG. 10 is a rear elevational view of the apparatus of FIG. 6.

The overall construction of this second embodiment is substantially the same as that of the first embodiment and as such repetition is not needed. Here too, the cap closes off the first channel and the integrated port 142, which is optionally threaded on the exterior communicates with channels 2, 3, and 4. As seen in the rear elevational view, FIG. 10, the port is positioned such that the bottom of the outside diameter thereof is flush with the bottom surface of the port cap apparatus 141. In FIG. 10 the end wall 150 of the baffle member 138 taken in conjunction with the thickness of the two skins 114, and 114' of the main body portion 111 and the two skins 132 and 132' seen in FIGS. 6 & 7, but unnumbered in FIG. 10 form the rear wall of the apparatus 141. Monoport cap 131 of FIG. 6, also seen in FIG. 7 is shown without one of its skins 132 in FIG. 7. Thus the size of the baffle member 138 is seen to be smaller in inward direction than is the interface edge 190 seen in FIG. 6. End blocks 133 similar to end blocks 33 are clearly visible in FIG. 7. Also it is to be seen that if desired the end blocks in both embodiments can be integrated with the baffle into one element.

Here too, as in the first embodiment the skins covering the baffle member extend inwardly beyond the recesses to form a transverse channel for the reception of the main body portion 111.

Figure 9:
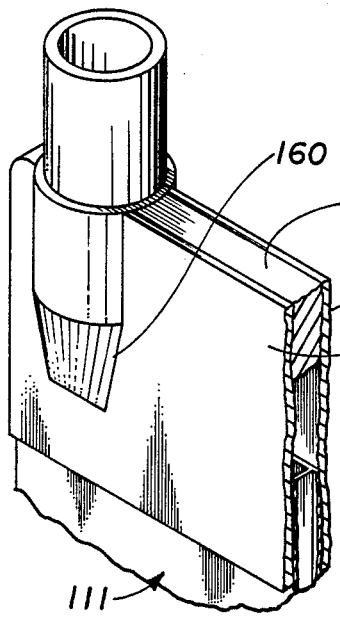
FIG. 9 is an oblique view of the end cap.

FIG. 9 is a top perspective closeup showing transition zone 16 degrees which smoothes the fluid flow from an entry such as 141 in FIG. 10, to the thickness of the end cap 132 for a more streamlined appearance.

In both embodiments, the two ports communicate with a number of channels of the main body that is ½ of the number of channels in communication with each recess. Hereto, the junction tips separate adjacent recesses, and likewise function to close off each finite number of channels, such as 6 from flow from the next adjacent finite number, here 6 channels.

Since fluid being introduced at one end flows down, here 3 channels, until it impinges upon the first recess at the opposite end of the panel. The fluid turns around, and then flows in a reversed direction. through the other 3 channels in fluid communication with this first recess at this opposite end of the panel.

A typical solar panel of this invention, measures 30" wide by 51" long and about ¼ inch thick at the main body and ⅜ inch thick at the monoport ends, but may vary in size up to 96 inches wide by 480 inches long. The difference in thickness or elevation being the thickness of the skins disposed on the baffle members such that these skins can overlie the main body portion of the apparatus. The ports may be made of ½" schedule 40 PVC pipe. A suitable caulking material may be used for the transition covering 160 as seen in FIG. 9. If desired the entire apparatus or on side thereof may be painted black to raise even more the temperature of the fluid passing therethrough as is known in the industry. Suitable paints are available in the marketplace for such heat absorbing purpose.

Figure 11:
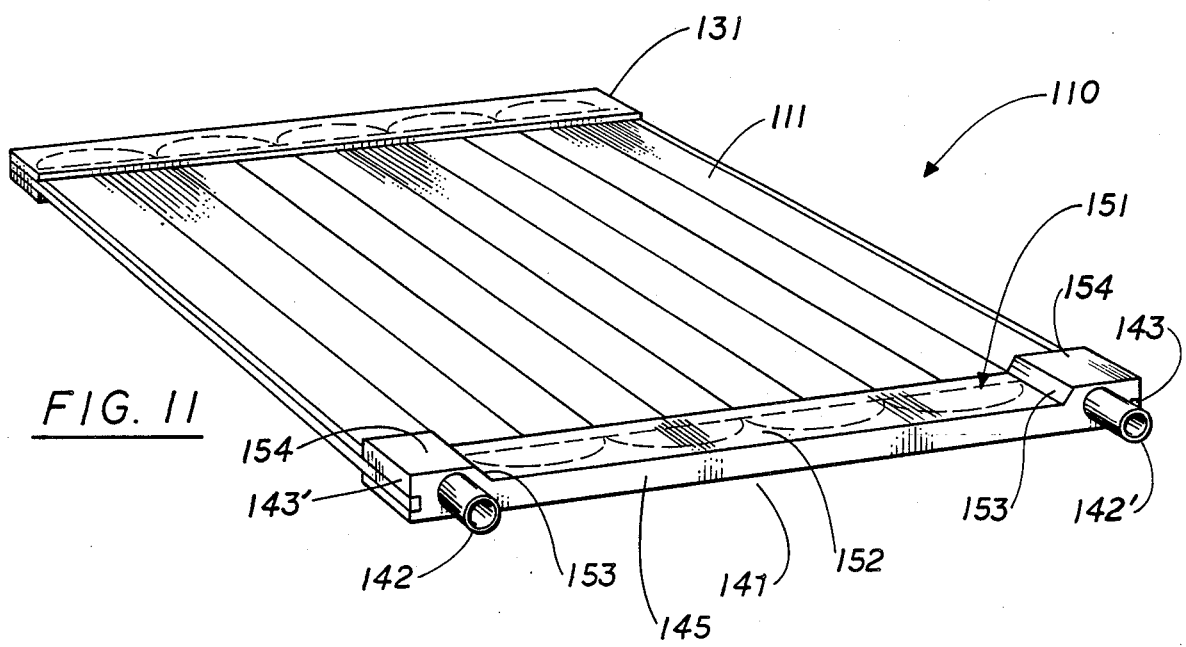
FIG. 11 is a view similar to FIG. 1 but of a cosmetic variance.

Reference should now be made to FIG. 11. This is a variant of the embodiment of FIG. 1. This variant designated 110 is similar in function and operation to the embodiment of FIG. 1. It differs however in appearance.

Thus port cap 151 includes a top surface 152, a pair of angled upwardly and outwardly mirror image inclined walls 153 at each end of upper surface or wall 152, and an upper top surface 154 at the end of each inclined wall 153. Upstanding wall 145 serves the same function as wall 45 taken in conjunction with the thickness of the two skins as shown in FIG. 1.

Elevated sidewalls 143, connect the upper top surfaces 144 to bottom wall 147. As is seen, the ports 142 and 142' are disposed within the confines of these end portions of the port cap thereby not necessitating the transition 150, as per FIG. 9.

It is also seen that main body portion 111 corresponds to body portion 11 and therefore fits within the confines of port cap 151 in like manner as in FIG. 1. Further discussion on this point is not needed, as is borne out by the presence of baffles shown in dotted line in FIG. 11, which baffles have been discussed at length in conjunction with FIG. 4. Suffice it also to say that end cap 13' is structurally the same as end cap 31 of FIG. 1, to further emphasize the point of cosmetic difference only.

It is seen that I have disclosed a low cost, easy to make solar panel that is light in weight, yet quite sturdy. As such one or more of these can be utilized to heat water for a small domestic hot water heater such as would be found in recreational vehicles. Other uses include the heating of water for therapy spas, and the preheating of water for such industrial uses as a car wash or laundry operation.

Since certain changes may be made in the above apparatus without departing from the scope of the invention herein involved, it is intended that all matter contained in the above description and shown in the accompanying drawings, shall be interpreted as illustrative and not in a limiting sense.

I claim:

1. A solar panel comprising a main body portion and a pair of caps in a mating arrangement at the opposite ends of the main body portion,
   wherein the main body portion comprises an integrated sheet formed from a pair of spaced skins separated by a series of uniformly spaced parallel ribs running the full length of the two skins, each pair of spaced ribs defining a channel for the flow of fluid, said body portion being disposed within said caps, and having a series of adjacent channels,
   each cap comprising (a) a baffle member having a front wall an upper and a lower surface, and a series of adjacent arcuate recesses therein each of which recesses extends inwardly from the front wall thereof, and each of which recesses communicates with a defined plurality of said channels, the baffle member having a thickness equal to the thickness of the main body portion; and (b) a pair of skins overlaid on each of the upper and lower surfaces of the baffle member and extending inwardly beyond the recesses to form a slot transverse to said channels for the receipt of the main body portion,
   both of said caps having from zero to two ports therein one port being for the introduction and one port being for the removal of fluid from said panel, the total number of ports being two; each of said ports being in fluid communication with a number of channels of the main body portion, said number being equal to ½ of the number of channels in fluid communication with each recess.

2. In the solar panel of claim 1 wherein each port fluidly communicates with 3 channels and each recess communicates fluidly with 6 channels.

3. In the solar panel of claim 1 wherein one cap contains both the input and output ports.

4. In the solar panel of claim 1 wherein each cap contains one port.

5. In the solar panel of claim 1 wherein each port communicates with a finite number of channels of the main body portion beginning at the second channel within the series of channels as counted from both of the outer edges of the main body portion.

6. In the solar panel of claim 5 wherein the first channel of the series of adjacent channels as counted from the outer edges of the main body portion is closed off by an end block.

7. In the solar panel of claim 6, wherein the first channel of the series of channels as counted from the outer edges of the main body portion is notched away and the space of said notches is filled by an end block extending axially from said baffle sections.

8. In the solar panel of claim 1 wherein the main body portion is made of polycarbonate.

9. In the solar panel of claim 8 wherein the caps are made of an acrylate plastic.

10. In the solar panel of claim 1 wherein the port is made of polyvinyl chloride.

11. In the solar panel of claim 1 wherein each cap having a port, has a port receiving section disposed outwardly of said arcuate recesses and within which the port is disposed.

12. In the solar panel of claim 11, wherein the first channel of the series of channels as counted from the outer edges of the main body portion is notched away and further wherein the second third and fourth channels of the main body portion are also notched, but to a lesser extent than the first channel from each outer edge, and said port receiving section extends forwardly into said notch to fluidly communicate with channels 2, 3, and 4.

13. In the solar panel of claim 12 wherein the space notched away in said first channel is filled by an end block extending radially from said baffle section.

* * * * *